(No Model.)
A. STEINHEIL.
Photographic Camera Lens.
No. 241,437. Patented May 10, 1881.
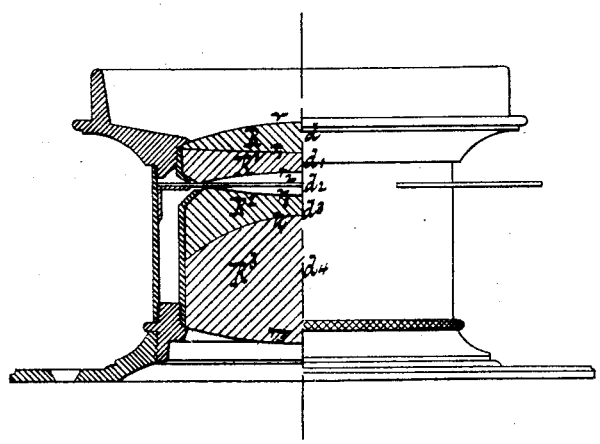
Witnesses
William Miller
Otto Hufeland
Inventor
Adolph Steinheil
by Van Santvoord & Hauff
his attorneys

UNITED STATES PATENT OFFICE.

ADOLPH STEINHEIL, OF MUNICH, BAVARIA, GERMANY.

PHOTOGRAPHIC-CAMERA LENS.

SPECIFICATION forming part of Letters Patent No. 241,437, dated May 10, 1881.

Application filed March 2, 1881. (No model.)

*To all whom it may concern:*

Be it known that I, ADOLPH STEINHEIL, a subject of the King of Bavaria, residing at Munich, in the Kingdom of Bavaria and German Empire, have invented new and useful Improvements in Photographic-Camera Lenses, of which the following is a specification.

This invention consists in the combination, in a photographic camera-lens, of two pairs of lenses, the first pair being composed of a biconvex flint-glass lens cemented to a biconcave crown-glass lens having a strong chromatic and spherical aberration and a focus somewhat smaller than that required for the complete lens, while the second pair of lenses, which is placed at a short distance from the first pair, consists of a biconcave flint-glass lens cemented to a biconvex crown-glass lens, and has a nearly infinite focus and a spherical and chromatic aberration equal in strength to that of the first pair, but in opposite direction, so that it forms a parallel lens which neutralizes the aberrations of the first pair.

This invention is illustrated in the accompanying drawing, which represents a sectional side view of my lens.

It has always been considered to be exceedingly difficult to construct double lenses (or lenses composed of two pairs) which produce plane images, and the distinctness of these images diminishes from the center toward the circumference slower or quicker, according to the greater or less degree of perfection in the construction of the lenses. By long-continued calculation I have found that the images produced by double lenses are more distinct toward the circumference the more unequally the effect of the complete lens is distributed between its two component parts or pair of lenses.

The aplanatic lens, named "anti-planet for groups," which forms the subject-matter of this present application, is intended for taking pictures in the open air, in which, on account of the reflections, not more than two lenses placed separate from each other are admissible, and therefore the lenses composing each pair must be cemented together.

The example shown in the accompanying drawing has a focus of two hundred and forty millimeters and an aperture of forty-three millimeters. The outer pair, which faces the incoming light, consists of a biconvex lens, R, of flint glass, which is cemented to a biconcave lens, R', of crown glass. This combination has a focus of about two hundred and sixteen millimeters and a strong chromatic and spherical aberration, also a strongly-curved image in the same direction as a single positive lens. The second pair, which is placed at a short distance from the first, consists of a biconcave lens, $R^2$, of flint glass, cemented to a biconvex lens, $R^3$, of crown glass. Its focus is nearly infinite, and it has a spherical and chromatic aberration equally strong to the first pair, but in opposite direction, so that it forms nearly a parallel lens, which neutralizes the faults of the first pair.

The species of glass used are as follows:

|  | Crown. | Light flint. |
|---|---|---|
| Refraction for yellow rays | 1.51705 | 1.57710 |
| Refraction for violet rays | 1.53250 | 1.60229 |

For a lens of the dimensions above stated I use the following elements:

In these formulas, $d$ $d_1$ $d_3$ $d_4$ represent the axial thickness of the respective lenses, and $d_2$ represents the axial distance between the lenses $d_1$ $d_3$, while $r$ $r_1$ $r_2$, &c., represent the radii of the curves to which said letters are respectively attached in the drawing.

$r = +$ 64.1 millimeters.
$r_1 = \pm$ 257.2 "
$r_2 = -$ 98.4 "

Light flint $d = 4.92$ millimeters.
Crown $d_1 = 4.1$ millimeters.

Distance between the two pairs of lenses $d_2 = 4.1$ millimeters.

$r_3 = -$ 98.4 millimeters.
$r_4 = \mp$ 34.44 "
$r_5 = +$ 72.1 "

Light flint $d_3 = 3.28$ millimeters.
Crown $d_4 = 24.6$ millimeters.

From this description it will be seen that the two pairs which constitute my lens contain very great but opposite faults, and at the same time have very unequal focuses, while the same, when combined, accomplish in a high degree all the conditions necessary for correct images.

I do not desire to limit myself to the precise species of glass named in the foregoing description, but reserve the right to substitute therefor other species of glass which will produce the same result.

What I claim as new, and desire to secure by Letters Patent, is—

The combination, in a photographic-camera lens, of two pairs of lenses, the first being composed of a biconvex flint-glass lens cemented to a biconcave crown-glass lens having a strong chromatic and spherical aberration and a focus somewhat smaller than that required for the complete lens, while the second pair of lenses, which is placed at a short distance from the first pair, consists of a biconcave flint-glass lens cemented to a biconvex crown-glass lens, and has a nearly infinite focus and a spherical and chromatic aberration equal in strength to that of the first pair, but in opposite direction, substantially as and for the purpose described.

In testimony whereof I have hereunto set my hand and seal in the presence of two subscribing witnesses.

ADOLPH STEINHEIL.

Witnesses:
OTTO WERNHARD,
EMIL HENZEL.